United States Patent [19]

Song

[11] Patent Number: 5,751,544
[45] Date of Patent: May 12, 1998

[54] COMPUTER WITH A DETACHABLE HINGED LCD DISPLAY CABLE CONNECTION

[75] Inventor: Kwang-Ho Song, Seoul, Rep. of Korea

[73] Assignee: SamSung Electronics Co., Ltd., Suwon, Rep. of Korea

[21] Appl. No.: 679,910

[22] Filed: Jul. 15, 1996

[30] Foreign Application Priority Data

Oct. 6, 1995 [KR] Rep. of Korea ............... 34296/1995

[51] Int. Cl.⁶ .................................. G06F 1/16; H05K 7/16
[52] U.S. Cl. ........................... 361/681; 439/165; 16/261
[58] Field of Search ................................. 361/680–683; 16/223, 261, 270; 364/708.1; 439/31, 165; G06F 1/16

[56] References Cited

U.S. PATENT DOCUMENTS

| | | |
|---|---|---|
| 4,959,887 | 10/1990 | Gruenberg et al. . |
| 5,043,846 | 8/1991 | Kinoshita . |
| 5,237,488 | 8/1993 | Moser et al. . |
| 5,390,075 | 2/1995 | English et al. . |
| 5,394,297 | 2/1995 | Toedter . |
| 5,498,165 | 3/1996 | Tseng . |
| 5,507,072 | 4/1996 | Youn ........................................ 16/261 |
| 5,566,048 | 10/1996 | Esterberg et al. ....................... 361/681 |
| 5,572,769 | 11/1996 | Spechts et al. ............................ 16/337 |
| 5,583,744 | 12/1996 | Oguchi et al. ........................... 361/683 |

*Primary Examiner*—Lynn D. Feild
*Attorney, Agent, or Firm*—Robert E. Bushnell, Esq.

[57] ABSTRACT

The present invention provides an improved routing arrangement for a cable that electrically connects the lid to the base of a notebook computer. The invention routes the cable along a hollow interior of a hinge mechanism. This invention has three aspects. First, the hinge mechanism allows an electrical cable, connecting the lid to the base, to traverse a large fraction of the entire hinge length. This reduces the stress put on the cable by flexing and twisting because the stress can now be distributed over a larger segment of the cable. Second, the hinge mechanism allows the cable to enter the lid portion from the hinge mechanism at the middle of the notebook computer. This reduces the weakening caused to the hinge and the lid in accommodating the cable. Lastly, hinge mechanism consists of few parts, allowing for a simple and inexpensive manufacturing and assembly process.

12 Claims, 4 Drawing Sheets

COMPUTER WITH A DETACHABLE HINGED LCD DISPLAY CABLE CONNECTION

CROSS REFERENCE TO RELATED APPLICATION

This application makes reference to, incorporates the same herein, and claims all benefits accruing under 35 U.S.C. §119 from an application for *A Simple LCD Display Cable Connection* earlier filed in the Korean Industrial Property Office on 6 Oct. 1995 and there duly assigned Serial No. 34296/1995.

FIELD OF THE INVENTION

The present invention relates generally to portable laptop computers and more particularly, to the routing of an electrical cable connecting a visual video display lid to a main body of a notebook computer.

BACKGROUND OF THE INVENTION

Conventionally, the electrical cable that connects a laptop notebook computer base to a display lid containing a video screen such as a liquid crystal display (e.g., a LCD) is positioned so that it undergoes stress and strain each time the lid is opened or closed. The prior art has attempted to deal with the situation by redesigning the hinge portion of the notebook computer with the cable rerouted so that it does not have to undergo any undue stress upon the opening or the closing of the lid. Often, the rerouting of the cable is along the axis of the hinge, thus reducing the stress and strain imposed at any one portion of the cable, thus prolonging the length of the life of the cable. For example, U.S. Pat. No. 4,959,887 for a *Center Pivot Cover* to Gruenberg et al. discloses a cable connecting apparatus where the cable is routed through a tube in the center of the hinge. One of the tubular sections is stationary with respect to the cover and the other tubular section is stationary with respect to the main body. The cable is hidden from view because of the tubular sections. A gap or passageway in the cylindrical sidewall of the tubular sections allow the cable to pass through to either the cover or the main body from the hinge. Gruenberg has several deficiencies. First, Gruenberg uses an extra part, the center cover part, in the assembly. This center cover part is not part of the working hinge. Thus, Gruenberg's invention is more complicated than it has to be. Next, the cable enters the lid at an off-center location. Thus, the hinge is weakened to accommodate the passage of the cable. Also, the cable is shown to traverse only a small segment of the axial length of the notebook computer. As a result, the hinge assembly in Gruenberg is limited in the amount of flexure it affords to the cable.

Another example is found in U.S. Pat. No. 4,864,523 for a *Portable Apparatus Having a Cable Guide Duct Mounted Between a Base Housing and a Display and Pivotally Connected to the Base Housing* to Sasaki discloses a cable routing apparatus for a portable computer. Like in Gruenberg '887, Sasaki '523 extends a cable in through a center portion, the guide duct, of the hinge from the base. The cable enters this portion radially through a slit opening. The cable then runs along the axis of a hollow hinge shaft and into a second tubular part, called the hollow shaft section. This hollow shaft section is fixed to the lid of the notebook computer and is located both on the left and on the right of the guide duct. The cable finally emerges through the cylindrical sidewall of the hollow shaft section and into the lid portion of the computer. Sasaki, however, requires multiple leads following different cable paths, which I have found to unnecessarily encumber the manufacturing process, and limits the leads' run to only a small fraction of the axial length, thereby requiring the leads to flex substantially.

In addition, U.S. Pat. No. 5,498,165 for a *Combined Hinge and Electrical Connector for Portable Computer* to Tseng discloses an electrical connection apparatus between a base and a cover of a notebook computer. The cable is routed through the hollow shaft of a pivoting hinge, where one portion of the pivoting hinge is fixed to the base and the portion of the pivoting hinge is fixed to the cover which rotates with respect to the base. The cable is visible and is exposed to damage by the user and the cable is never routed through the center of the device. Likewise, U.S. Pat. No. 5,043,846 for a *Pivotable Display Unit Support Structure for Electronic Apparatus* to Kinoshita discloses a cable routing apparatus between a base and a lid of a notebook computer. The cable passes through the hollow shaft of a hinge fixed to the base before entering the lid. The cable must be substantially flexed when installed and used because the cable extends down only a small fraction of the axial length, and because the diameter of the tubular portion is small.

A slightly different approach to solving the above problem is disclosed in U.S. Pat. No. 5,390,075 for an *Electronic Apparatus with Flexible Cable Interconnect Having Independently Movable Member supported on Tab Portions* to English et al. Instead of having the cable run along the hollow shaft axis of a hinge, English has the cable run radially through a hinge part. The hinged part through which the cable passes through is cylindrical and has two openings opposite to each other to allow a cable to pass through in a radial direction perpendicular to the hinge axis. The hinged part through which the cable passes through is neither fixed to the lid nor the base, but instead rotates with the lid but at a slower rate than the lid when the lid is opened or closed. The result is a cable routing arrangement that does not require a cable to be bent, nor subject to excessive stress on any portion of the cable. English, however, involves a more complicated hinge design which is more difficult to manufacture and assemble.

Finally, U.S. Pat. No. 5,237,488 for a *Portable Computer with Display Unit Connected to System Unit Through Conducting Hinge* to Moser et al discloses an electrically conductive hinge between a base and a lid of a notebook computer. As with Sasaki and Gruenberg, the electrical conduction path passes along the axis of the hinge through a hinge part connected to the base, and through a hinge part connected to the lid. Unlike Sasaki and Gruenberg, no cables are used. Instead, electrical connectors and wipers are used. The part of the hinge that is fixed to the lid is in the center of the notebook computer, causing the electrical connection to enter the hinge from the main body either to the left or to the right of center while entering the lid from the hinge at the center. I have found that Moser is burdened with the fact that wipers have to be used to effectuate the electrical connection.

Generally, although there have been many effects to route the electrical cable along the interior of a hollow tubular hinge, I have found that these efforts fail to accommodate sufficient movement of the cable to avoid risk of premature failure of the miniature conductors within the cable through fatigue and exposure to inadvertent damage.

SUMMARY OF THE INVENTION

It is therefore the object to provide an apparatus for a notebook computer better able to preserve the electrical integrity of cables interconnecting the video display mounted in a lid that is rotatably connected to the base of the notebook.

It is another object to provide a notebook computer that reduces the amount of flexing and twisting that a cable electrically connecting the lid to the base must undergo by extending the cable through a large portion of the hinge axis.

It is still another object to provide a cable bearing hinge assembly for a notebook computer made up of few parts thus reducing the expense and time of manufacturing and assembly.

It is yet another object to provide a hinge assembly for a notebook computer that has the cable enter the lid from the center of the hinge axis, thus reducing the weakening of the device caused by the aperture that accommodates the cable.

These and other objects may be achieved by providing an improved hinge mechanism that allows an electrical cable connecting the base to the lid of the notebook computer to extend down a large fraction of the hinge axis before entering either the base or the lid. This is accomplished by having the cable emerge through an aperture in a rear corner of the top side of the base housing, and having the cable enter one end of a cylindrical hinge assembly. The cable traverses about one-half of the entire length of the hinge axis, only to then enter the lid portion of the notebook computer. The result is an electrical cable that is protected from breaking because the curving, bending, and twisting of the cable are extended over a large segment of the cable. In addition, the weakening of the hinge assembly and the lid structure are minimized by allowing the cable to enter the lid at the center of the notebook computer. The hinge assembly is made up of a small number of components, providing a design that is easy and inexpensive to make and assemble.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
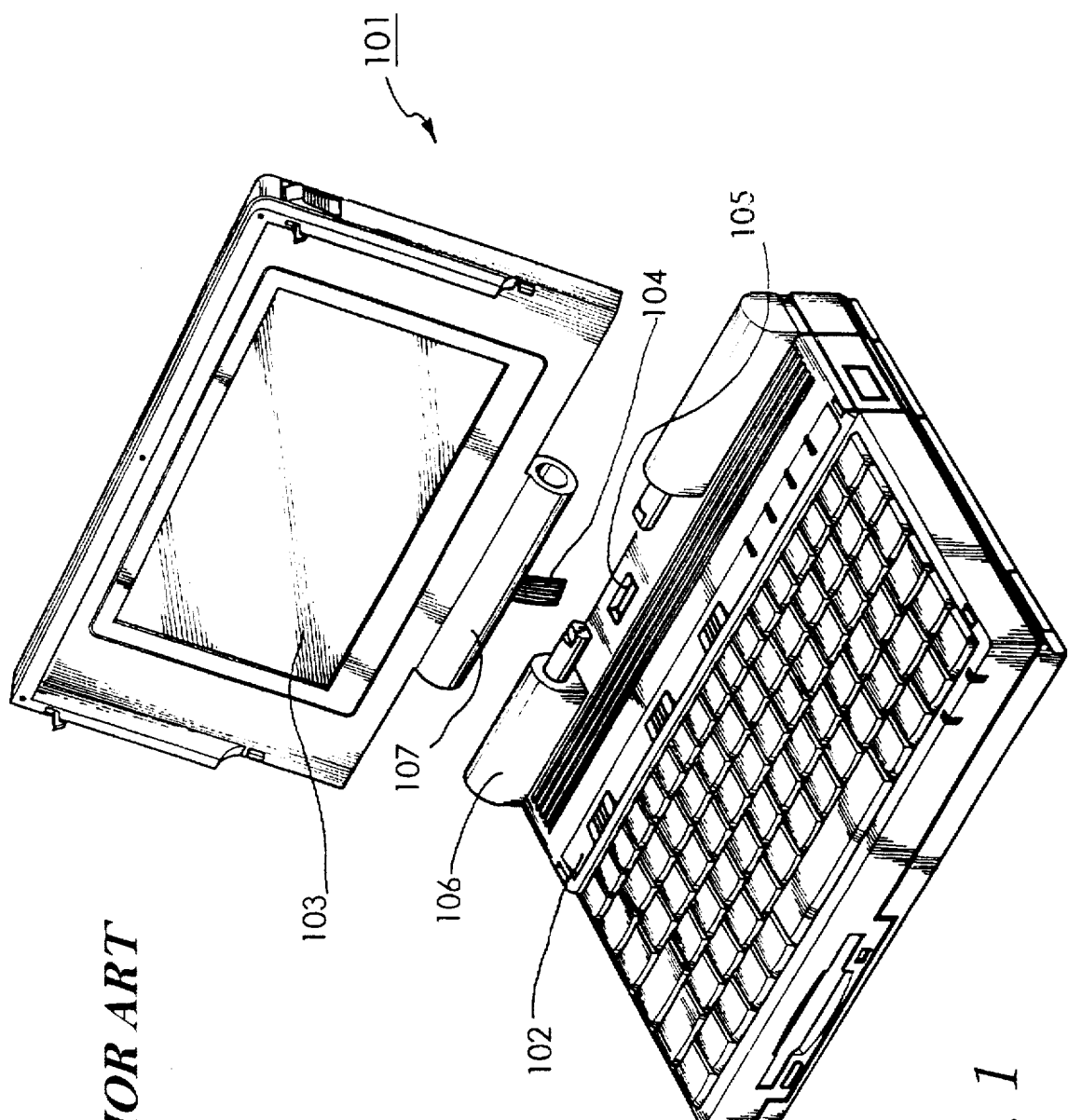
FIG. 1 is a separated perspective view of a conventional notebook computer showing the conventional cable routing arrangement.

FIG. 1 shows a perspective view of a hypothetical conventional computer 101. Computer 101 has main body 102 and LCD display 103. The electrical connection between main body 102 and LCD display 103 is made through cable 104, which is connected to LCD display 103, and connector groove 105, which is formed in the center, back part of main body 102.

When cable 104, extending through connector groove 105, electrically connects main body 102 to LCD display 103, hinge portion 107 of LCD display 103 is connected to hinge member 106.

In contemporary designs for notebook computers, because the electrical connection by cable 104 is made through connector groove 105 in the rear central part of main body 102, the process of merging LCD display 103 to main body 102 and the process of assembling cable 104 are done simultaneously. As a result, the total assembly is cumbersome and difficult. In addition, because LCD display 103 is opened and closed from main body 102 as the user sees fit, cable 104 is stressed by the pressure received from this repetitive opening and closing of LCD display 103. Cable 104 is forced to bend over a very small segment, making cable 104 prone to wear out quickly through repeated flexing and the consequent fatigue concentrated at this small segment of the conductor. Also, the opening angle of LCD display 103 is limited by cable 104.

Figure 2:
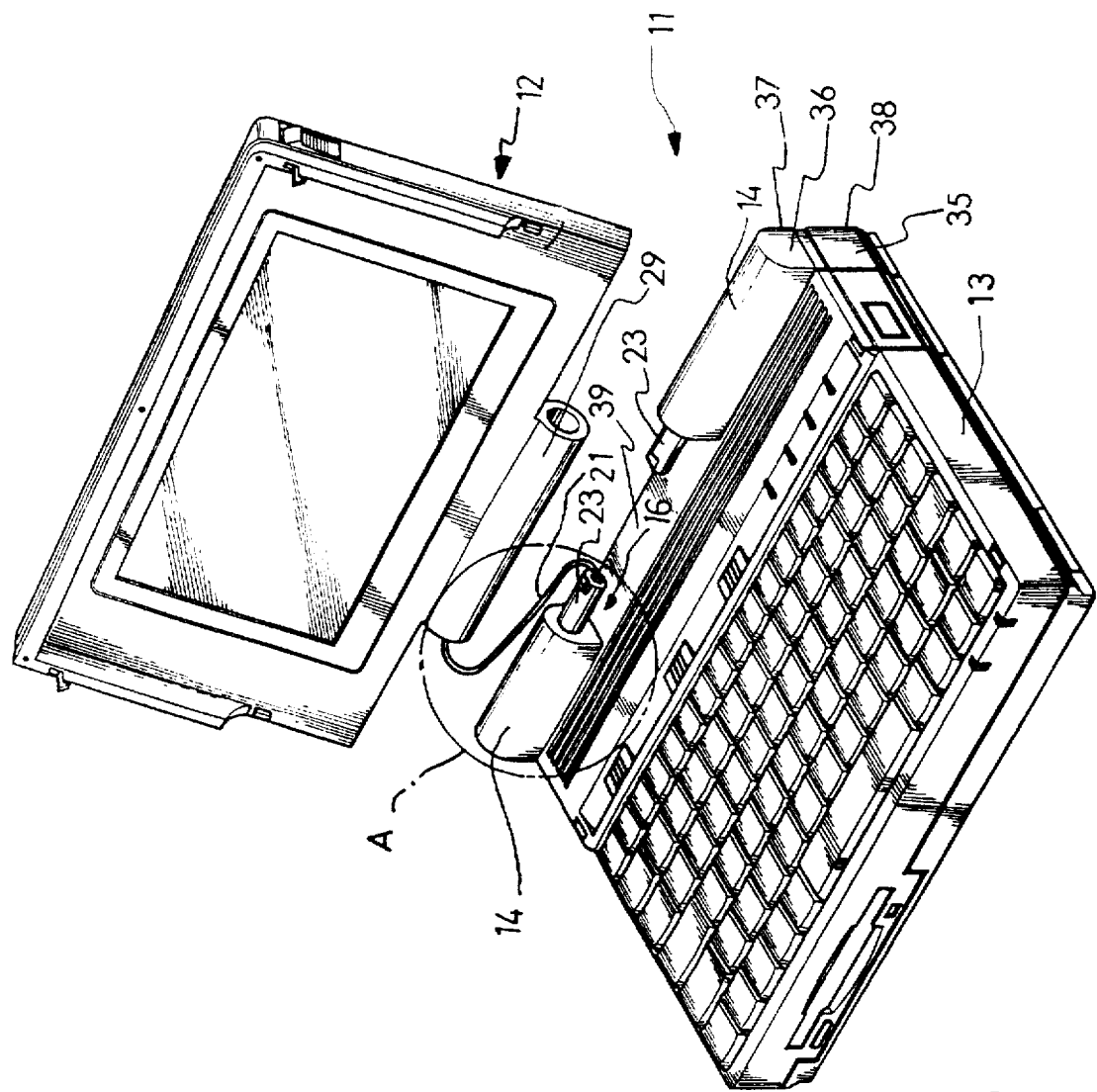
FIG. 2 is a separated perspective view of a computer in accordance with the present invention.
Figure 3:
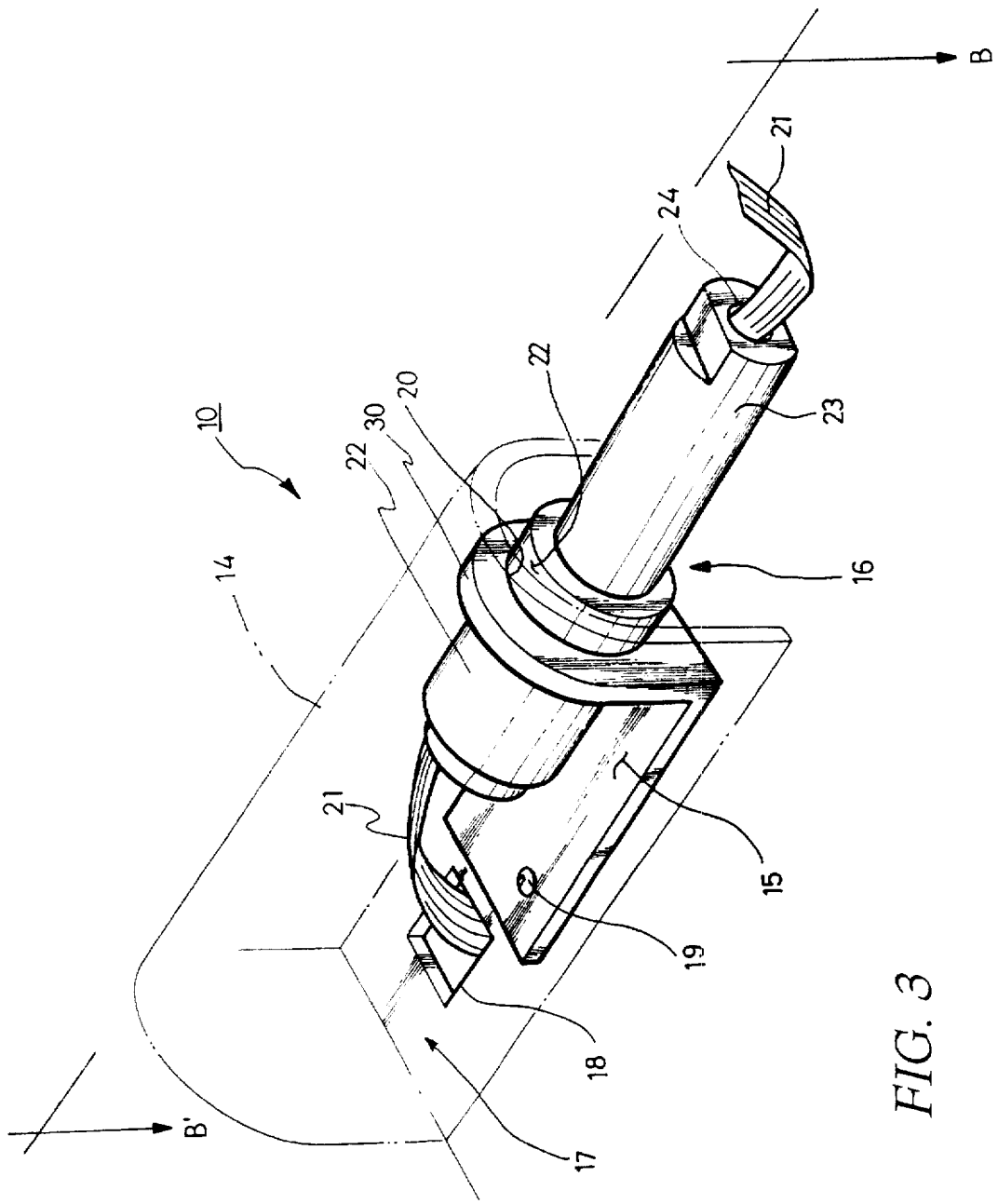
FIG. 3 illustrates an enlarged view of circled detail A in FIG. 2 in accordance with the present invention.
Figure 4:
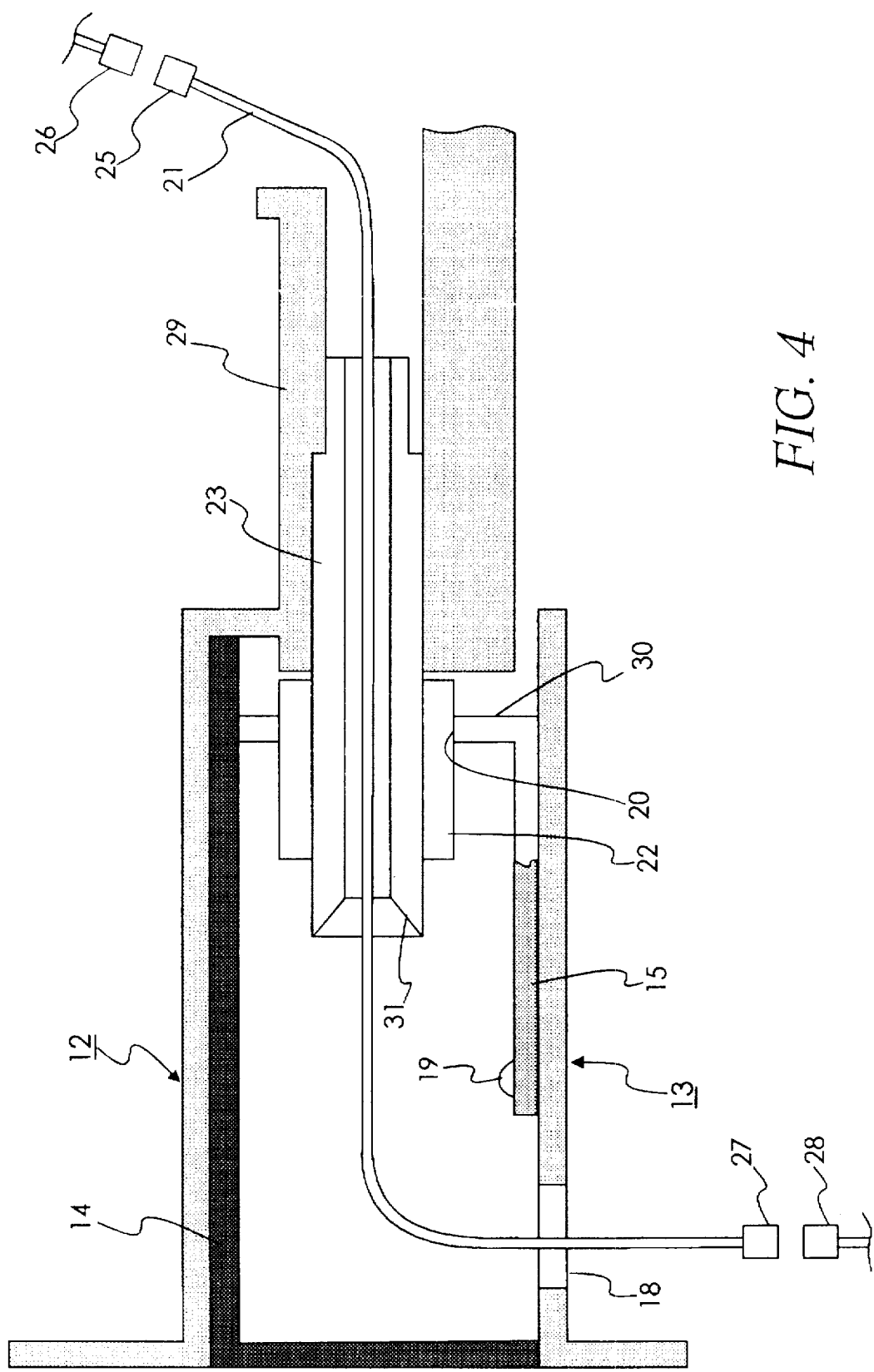
FIG. 4 is a sectional side view of FIG. 3 along sectional line B–B' showing the main part of a hinge structure in accordance with the present invention.

One embodiment of the present invention is depicted in FIGS. 2 through 4. FIG. 2 shows notebook computer 11 with LCD display 12 detached in order to show the adjoining hinge portions. Hinge portions 10 of notebook computer 11, pivotally connect LCD display 12 to main body 13. Hinge portion 10 includes hinge housing 14, fixed bracket 15, and hinge axis 16. Hinge housing 14 of hinge portion 10 is integrally formed on to main body 13, with mounting chamber 17 inside hinge housing 14. Fixed bracket 15 is mounted by screw 19 to main body 13 near through hole 18, which is formed on the top side of main body 13 on rear ledge 19 and underneath hinge housing 14. Hinge axis 16 of hinge portion 10 is fixed in mounting hole 20 which is formed on fixed bracket 15. Through this construction, hinge axis 16 supports tubular section 29 of LCD display 12 when being opened and closed, and allows a passageway for cable 21 which is used to electrically connect LCD display 12 to main body 13. Hinge axis 16 includes hollow tube 22 installed in mounting hole 20 of vertical portion 30 of fixed bracket 15. Hollow hinge shaft 23 is inserted in hollow tube 22 and, thus, hinge axis 16 is able to rotate. Cable 21, by passing from through hole 18 and then through hollow portion 24 of hollow hinge shaft 23, is able to connect with LCD display 12. As seen in FIG. 4, the width of hole 18 in rear ledge 39 is substantially larger than the thickness of cable 21. Also shown is the beveled opening 31 on the end of hinge shaft 23 through which cable 21 passes. These features help reduce the amount of bending and twisting that cable 21 must undergo. So in this way, the present invention connects the LCD display 12 to main body 13, and through hollow hinge shaft 23 of hinge portion 16, support is received during rotation.

The corners formed by hinge housing 14 on rear ledge 39 of main body 13 are flush to each other. As seen in FIG. 2, right wall 36 of hinge housing 14 lies flush with right face 35 of rear ledge 39 of main body 13. The same can be said for the left side. Similarly, rear face 37 of hinge housing 14 lies flush with rear face 38 of rear ledge 39 of main body 13. When LCD display 12 is pivoted closed, the side and rear faces of the cover are flush with right wall 36 and rear face 37 respectively of hinge housing 14. These flush corners are a characteristic of notebook computers. The above invention pertains to notebook computers having the flush corner feature aforementioned.

The assembly process is made simple, because cable 21 is connected to LCD display 12 through hollow portion 24 of hollow hinge shaft 23. In the present invention, cable 21 is passed through hollow hinge shaft 23 of hinge portion 16. After this operation is completed, hinge portion 16 is assembled to main body 13 by using screw 19, then connector 27 of cable 12 is assembled to connector 28 of main body 13. Also, connector 25 of cable 12 is assembled to LCD display connector 26, and so the connection between LCD display 12 and main body 13 is made through hinge portion 16. As is illustrated in FIGS. 2 through 4, cable 21 is inserted into beveled opening 31 of hollow portion 24 of hollow hinge shaft 23 near through hole 18. Cable 21 runs along hinge axis 16 until it reaches the center of the hinge axis inside hollow portion 29 of LCD display 12. From the center of the hinge axis, cable 21 enters LCD display 12. Thus, the cable runs along the hinge axis for a distance of one half the width of notebook computer 11. Cable 21 is less apt to undergo excess stress and strain during the opening and closing of LCD display that could wear out or cause cable 21 to fail through fatigue, because cable 21 runs along the hinge axis for a substantial distance. This is because cable 21 can bend and twist over a longer segment preventing excess stress. Also, because cable 21 enters LCD 12 at the center of the hinge axis, the hinge mechanism and the LCD display are less apt to be weakened in accommodating cable 21.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A notebook computer apparatus comprising:

a base housing having a top surface having a keyboard, a rear end wall, and an aperture on said top surface near said rear end wall;

a rectangular display housing having a hollow tubular element attached along one edge;

a hinge assembly pivotably connecting said edge of said rectangular display containing said hollow tubular element to said rear end of said base housing, said hinge assembly having an axial length equal to the length of said edge of said display housing containing said hollow tubular element, said hinge assembly comprised of a first and a second substantially hollow cylindrical portions mounted on said base housing along said rear end wall of said base housing, said first and second cylindrical portions each having an inside and an outside end, said first and said second cylindrical portions being arranged so as to form a gap between said inside end of said first portion and said inside end of said second portion, said inside ends of said first and said second cylindrical portions can be inserted into said hollow tubular element attached to said edge of said display housing; and a cable electrically connecting said display housing to said base housing, said cable exiting said aperture on said top side of said base housing, said cable inserted into said outside end of one of said first and second cylindrical portions, said cable emerging from said inside end of said one of said first and second cylindrical portions inside said hollow tubular element attached to said edge of said rectangular display housing, said cable exiting said hollow tubular element and into said display housing through an aperture in a cylindrical sidewall of said hollow tubular element.

2. The notebook computer of claim 1, where said cable is terminated by connectors for electrically connecting said cable to said display housing and said base housing.

3. The notebook computer of claim 1, where said cable between said aperture on said top side of said base housing and said one of said first and second cylindrical portions is covered by a hinge housing obscuring said cable from view.

4. The notebook computer of claim 1, where said cable has a flat configuration.

5. The notebook computer of claim 1, where said cable enters said display housing from said hollow tubular element at the center of said edge of said display housing.

6. The notebook computer of claim 1, where each of said first and said second hollow cylindrical portions is mounted onto said base housing by a bracket member.

7. The notebook computer of claim 1, where said cable passes axially through said hinge assembly.

8. The notebook computer of claim 1, where said cable passes axially through said hinge assembly for a distance of approximately one half said axial length.

9. The notebook computer of claim 1, where said first and said second cylindrical portions of said hinge assembly are each covered with a corresponding hinge housing.

10. The notebook computer of claim 9, where each said hinge housing is located on said top side of said base housing flush against a respective corner with said rear end wall.

11. A notebook computer having a video display rotatably attached to a base housing, comprising:

a cable for electrically connecting the video display to the base housing;

the video display comprising a rectangular display having a hollow tubular element attached along one edge thereof, said hollow tubular element having a first end and a second end; and a hinge portion having first and second substantially hollow cylindrical portions mounted on said base housing, said first and second cylindrical portions each having an inside end and an outside end, said first and said second cylindrical portions being arranged so as to form a gap between said inside end of said first portion and said inside end of said second portion, said inside end of said first and said second cylindrical portions being inserted into said first end and said second end respectively of said hollow tubular element attached to said edge of said rectangular display allowing rotational opening and closing of the video display, said cable being disposed within said hollow cylindrical portions of said hinge portion to connect said video display to said base housing.

12. The process of connecting a video display to a base housing of a notebook computer, comprising:

providing a plurality of clamps;

attaching a hinge portion to each clamp;

inserting an electrical cable through an aperture in one of said hinge portions;

electrically connecting a first connector to said electrical cable;

electrically connecting a second connector to said electrical cable;

attaching each of said clamps to the base housing;

attaching the video display to said hinge portion; and electrically connecting the video display to said second connector.

* * * * *